United States Patent
Masui

(10) Patent No.: US 6,556,523 B1
(45) Date of Patent: Apr. 29, 2003

(54) WOBBLE-SIGNAL DETECTING DEVICE AND INFORMATION RECORDING APPARATUS

(75) Inventor: Naruhiro Masui, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/537,894

(22) Filed: Mar. 29, 2000

(30) Foreign Application Priority Data

Mar. 31, 1999 (JP) .......................... 11-092821

(51) Int. Cl.$^7$ ................................. G11B 7/00
(52) U.S. Cl. ................ 369/47.28; 369/124.14; 369/59.21
(58) Field of Search .............. 369/275.4, 275.5, 369/283, 44.13, 44.26, 44.28, 44.38, 47.28, 47.27, 47.31, 47.47, 124.12, 47.37, 124.13, 59.23, 124.14, 59.21

(56) References Cited

U.S. PATENT DOCUMENTS

| | | | | |
|---|---|---|---|---|
| 6,081,490 A | * | 6/2000 | Kuroda et al. | 369/47.28 |
| 6,097,678 A | * | 8/2000 | Yoshida et al. | 369/47.48 |
| 6,192,012 B1 | * | 2/2001 | Kim | 369/275.4 |
| 6,192,015 B1 | * | 2/2001 | Kim | 369/124.14 |
| 6,324,136 B1 | * | 11/2001 | Yoshida et al. | 369/47.22 |
| 6,331,967 B1 | * | 12/2001 | Matsui et al. | 369/277 |
| 6,341,110 B1 | * | 1/2002 | Tawaragi | 369/275.4 |

FOREIGN PATENT DOCUMENTS

| | | |
|---|---|---|
| JP | 9-326138 | 12/1997 |
| JP | 10-293926 | 11/1998 |

* cited by examiner

Primary Examiner—Thang V. Tran
Assistant Examiner—Kimlien Le
(74) Attorney, Agent, or Firm—Dickstein Shapiro Morin & Oshinsky LLP

(57) ABSTRACT

A wobble-signal detecting device detects a wobble signal based on a signal which is the difference between outputs of two divisions of a light receiving device. These two divisions are located on both sides of a line parallel to a target portion of an information recording track. This light receiving device receives light reflected by a recording medium as a result of an optical beam being incident on the recording medium. This recording medium contains the information recording track, which wobbles at a predetermined frequency, and has pre-pits formed at predetermined intervals in areas between the information recording tracks. This light receiving device comprises a pre-pit controlling portion which removes or reduces the pre-pit components of the signal which is the difference between the outputs of the two divisions of the light receiving device, and outputs a pre-pit-component-controlled signal; and a wobble-frequency-component extracting portion which extracts wobble-frequency components from the pre-pit-component-controlled signal and outputs a wobble-frequency-component signal, the wobble signal being obtained based on the wobble-frequency-component signal.

7 Claims, 5 Drawing Sheets

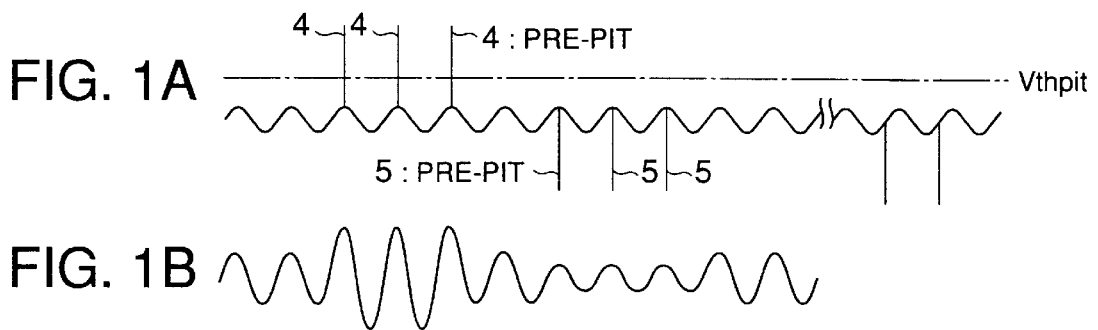
FIG. 1A
FIG. 1B
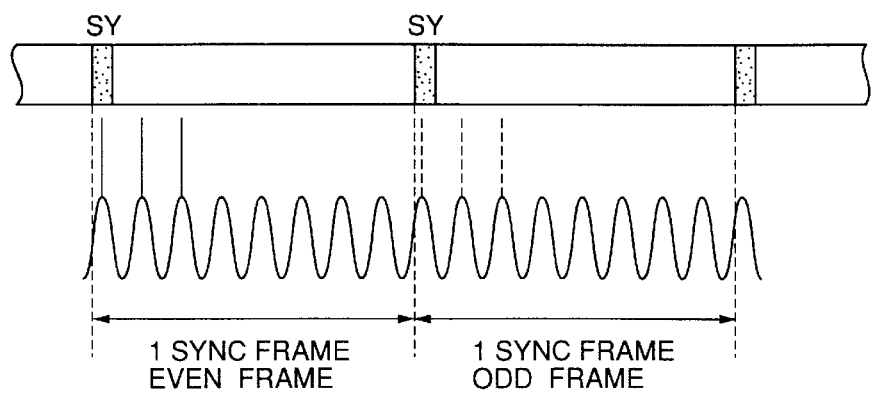
FIG. 2

WOBBLE-SIGNAL DETECTING DEVICE AND INFORMATION RECORDING APPARATUS

BACKGROUND OF THE INVENTION

1. Field of the Invention

The present invention generally relates to a wobble-signal detecting device for detecting a wobble signal from a recording medium having a recordable information recording track which, or recordable information recording tracks, each of which wobbles at a predetermined frequency (this means that a track formed on the disc wobbles in such a manner that, when the rotation of the disc is ideally controlled, the wobbles occur for a pickup at the predetermined frequency, here and hereinafter) and pre-pits formed at predetermined intervals in areas between the information recording tracks, and, to an information recording apparatus such as a DVD-R drive, a recordable-optical-disc recording and reproducing apparatus or the like using the above-mentioned wobble-signal detecting device.

2. Description of the Related Art

In the related art, there is an optical recording medium having a wobbling groove and pits formed in areas between the grooves at predetermined intervals and a recording and reproducing apparatus for the optical recording medium (for example, see Japanese Laid-Open Patent Application No. 9-326138). In such an apparatus, it is possible to obtain address information and disc rotation control information precisely even with a narrow track pitch, and high-density recording is enabled.

Further, there is a recording-clock-signal generating device for a recording apparatus which records data based on a recording clock signal phase-locked to a wobble signal on an optical disc having a data recording track which wobbles in accordance with a wobble signal having a predetermined frequency component and pre-pits having a predetermined phase relationship with the wobble signal (for example, see Japanese Laid-Open Patent Application No. 10-293926).

In such an apparatus, the phase of the recording clock signal is adjusted using a phase adjusting signal generated as a result of the phase of the extracted wobble signal and the phase of the pre-pit detection signal being compared with one another, and it is possible to generate the recording clock signal precisely in synchronization with the disc rotation even when influence of cross talk due to the wobble signal of an adjacent groove track exists.

On a recordable optical disc, address information and a synchronization signal for rotation control and recording position control are previously recorded as a pre-format.

As one of the methods for recording such preformat information, there is a method in which, for example, a so-called CD-R has a groove (data recording track) wobbling at a predetermined frequency and address information is recorded as a result of the wobbles being frequency-modulated.

In order to extract the wobble signal, a socalled push-pull signal is caused to pass through a band pass filter (referred to as simply 'BPS', hereinafter), the central frequency of which is the above-mentioned predetermined frequency, and rotation control is performed so that the frequency of the thus-extracted wobble signal becomes the predetermined frequency.

As is well known, the push-pull signal is the difference (differential signal) between the outputs of two divisions of a light-receiving device, which two divisions are obtained as a result of the light-receiving device being divided by a line parallel to the direction of the tangent of the track at a target position, and receiving the light reflected by the disc.

Further, the wobble signal is used as a reference signal for generating the recording clock signal, and, thereby, it is possible to record data in synchronization with the rotation of the disc.

Japanese Laid-Open Patent Application No. 9-326138 proposes an optical disc having a wobbling groove and pits formed in areas (lands) between the grooves at predetermined intervals, and it is possible to precisely obtain address information and disc rotation control information even with a narrow track pitch.

This method is different from another method in which address information is arranged at the start of a sector. That is, in this method, no address pits exist in the groove which is the data recording track. As a result, high-density recording is enabled, recorded information is not divided by the address information, and superior interchangeability with a reproduction-only disc is provided.

Such an apparatus uses a method in which the wobble signal and pit signal are read out simultaneously using one beam spot using the push-pull method, and, similar to the case of CD-R, the wobble signal is extracted through BPF, is used for disc rotation control, and, also, is used as a reference signal for generating the recording clock signal. A DVD-R studied recently has a form similar to the above-described optical disc.

For example, for DVD-R, the track pitch is narrowed for performing high-density recording. Thereby, so-called cross talk from a groove adjacent to a groove on which an optical beam is incident cannot be ignored.

When cross talk from adjacent inner and outer grooves exists, the wobble signal is interfered with by wobble components of the adjacent grooves, and, as a result, fluctuates in the amplitude and/or phase thereof. In particular, when phase fluctuation occurs, it is not possible to generate the recording clock signal precisely in synchronization with rotation of the disc.

In order to solve this problem, a device such as that disclosed in Japanese Laid-Open Patent Application No. 10-293926 is proposed.

This is a recording-clock-signal generating device for a recording apparatus which records data based on the recording clock signal which is phase-locked to the wobble signal on an optical disc having the data recording track which wobbles in accordance with the wobble signal having the predetermined frequency component and pre-pits having the predetermined phase relationship with the wobble signal. In this device, the phase of the recording clock signal is adjusted using the phase adjusting signal generated as a result of the phase of the extracted wobble signal and the phase of the pre-pit detection signal being compared with one another.

Thereby, it is possible to generate the recording clock signal precisely in synchronization with the disc rotation even when influence of cross talk due to the wobble signal of an adjacent groove track exists.

Thus, the wobble signal is important for disc rotation control and generation of the recording clock signal, and, in particular, detection of the wobble signal having few jitters (phase fluctuation) is indispensable for providing with high accuracy the recording clock signal in synchronization with disc rotation.

However, there is a cause for fluctuations in the amplitude and/or phase of the wobble signal other than the influence of cross talk due to the wobble signal of an adjacent groove track.

That is, the push-pull signal detected by the push-pull method from a recording medium having a wobbling groove and pits formed in lands at predetermined intervals includes the wobble component and pre-pit components, as shown in FIG. 1A. Then, when the wobble signal is extracted from this push-pull signal through a BPF, the central frequency of which is the wobble frequency, the signal including not only the wobble component but also the wobble-frequency component of the pre-pit components is extracted. This wobble-frequency component of the pre-pit components becomes the cause for fluctuations in the amplitude and/or phase of the wobble signal.

Normally, as shown in FIG. 1A, the pre-pit-signal components are larger than the wobble component, so the wobble-frequency component of the pre-pit components becomes larger as the amplitude of the pre-pit components becomes larger, and, thereby, the influence thereof to the wobble signal (wobble component+wobble-frequency component of the pre-pit components) cannot be ignored.

For example, for the DVD-R, pre-pits are formed in a land adjacent to and the outer side of a groove, and, in a land adjacent to and on the inner side, pre-pits for the immediately inner groove are formed.

The outer-side pre-pits, that is, the pre-pits for the target groove are formed in a fixed phase relationship with the wobbles of the target groove. However, because the inner-side pre-pits are pre-pits for the next inner groove, the phase relationship with the wobbles of the target groove varies depending on position.

The pre-pit components from both the outer-side and inner-side pre-pits are included in the push-pull signal for the target track.

In FIG. 1A, the upper pre-pit components 4 correspond to the outer-side pre-pits and the lower pre-pit components correspond to the inner-side pre-pits.

Further, because the pre-pits indicate address information and so forth by presence/absence thereof, the pre-pits are not formed in a fixed pattern, and, thereby, not only each frequency component but also the wobble-frequency component of the pre-pit signal vary locally.

Therefore, the degree in which the pre-pit components corresponding to the inner-side and outer-side pre-pits vary the amplitude and/or phase of the wobble signal varies depending on the pattern of the pre-pits.

The amplitude/phase fluctuation of the wobble signal due to the pre-pits is different from phase fluctuation due to cross talk in a relatively low frequency compared to phase fluctuation in a relatively high frequency.

Accordingly, to the wobble component of a fixed frequency, the wobble-frequency component of the pre-pit components of the same frequency, the phase of which varies every moment and also the amplitude of which varies, is added. As a result, the amplitude and phase or the wobble signal vary in every moment from the original amplitude and phase, and, thereby, the jitters of the recording clock signal generated from the wobble signal increase.

Further, depending on the relationship between the amplitude of the wobble component and the amplitude of the pre-pit components, the amplitude of the wobble signal may vary as if the wobble signal disappears, as shown in FIG. 1B. Thereby, disc rotation control and, in particular, generation of the recording clock signal are greatly adversely affected.

SUMMARY OF THE INVENTION

The present invention has been devised in consideration of the above points, and, an object of the present invention is to provide a wobble-signal detecting device which detects a wobble signal, from a recording medium having a groove which, or grooves each of which wobbles at a predetermined frequency and pre-pits formed in lands at predetermined intervals, having a lesser phase fluctuation by reducing amplitude and phase fluctuation of the wobble signal due to the pre-pits, and to provide an information recording apparatus which can record data on a disc in synchronization with the rotation of the disc with high accuracy.

A wobble-signal detecting device, according to the present invention, for detecting a wobble signal based on a signal which is the difference between outputs of two divisions of a light receiving device, the two divisions being located on both sides of a line parallel to an information recording track at a target position thereof, the light receiving device receiving light reflected by a recording medium as a result of an optical beam being incident on the recording medium, the recording medium having the information recording track which or the information recording tracks each of which wobbles at a predetermined frequency, and pre-pits formed at predetermined intervals in areas between the information recording tracks, comprises:

a pre-pit controlling portion which removes or reduces the pre-pit components of the signal which is the difference between the outputs of the two divisions of the light receiving device, and outputs a pre-pit-component-controlled signal: and a wobble-frequency-component extracting portion which extracts wobble-frequency components from the pre-pit-component-controlled signal and outputs a wobble-frequency-component signal, the wobble signal being obtained based on the wobble-frequency-component signal.

In this arrangement, the pre-pit components included in the push-pull signal (signal which is the difference between outputs of two divisions of a light receiving device) is removed or reduced. Thereby, it is possible to reduce the influence of the pre-pit components to the wobble signal, to reduce amplitude and phase fluctuation of the wobble-frequency-component signal due to the pre-pit components, and to reduce phase fluctuation of the wobble signal (two-value signal).

A wobble-signal detecting device, according to another aspect of the present invention, for detecting a wobble signal based on a signal which is the difference between outputs of two divisions of a light receiving device, the two divisions being located on both sides of a line parallel to an information recording track at a target position thereof, the light receiving device receiving light reflected by a recording medium as a result of an optical beam being incident on the recording medium, the recording medium having the information recording track which or the information recording tracks each of which wobbles at a predetermined frequency, and pre-pits formed at predetermined intervals in areas between the information recording tracks, comprises:

a limiter which limits the amplitude of the signal which is the difference between the outputs of the two divisions of the light receiving device and outputs an amplitude-limited signal so that the amplitude of the amplitude-limited signal does not exceed both or at least either one of a predetermined upper-limit value and a predetermined lower-limit value; and a wobble-frequency-component extracting portion which extracts wobble-frequency components from the amplitude-limited signal and outputs a wobble-frequency-component signal, the wobble signal being obtained based on the wobble-frequency-component signal.

In this arrangement, the amplitudes of the pre-pit components included in the push-pull signal (signal which is the difference between outputs of two divisions of a light receiving device) are limited. Thereby, it is possible to reduce the influence of the pre-pit components on the wobble signal, to reduce amplitude and phase fluctuation of the wobble-frequency-component signal due to the pre-pit components, and to reduce phase fluctuation of the wobble signal (two-value signal).

The upper-limit value and lower-limit value used by the limiter may be variable. Thereby, it is possible to set the upper-limit value and lower-limit value arbitrarily. Accordingly, it is possible to effectively cope with a case where the optimum values of the upper-limit value and lower-limit value are different depending on the type of the disc, whether data is being recorded or being reproduced, and so forth.

The wobble-signal detecting device may further comprise:

a filter which cuts off high-frequency components of the output signal of the limiter or the signal which is the difference between the outputs of the two divisions of the light receiving device;

an adder which adds a predetermined value to the output of the filter; and a subtractor which subtracts a predetermined value from the output of the filter, wherein the limiter uses the output of the adder as the upper-limit value and uses the output of the subtractor as the lower-limit value.

In this arrangement, the upper-limit value and lower-limit value used by the limiter for limiting the amplitude of the push-pull signal change in accordance with the change in the push-pull signal. As a result, it is possible to limit the amplitudes of the pre-pit components more precisely. In particular, it is possible to effectively limit the amplitudes of the pre-pit components not located at the peaks of the wobbles. Accordingly, it is possible to further reduce the influence of the pre-pit components to the wobble signal, to further reduce amplitude and phase fluctuation of the wobble-frequency-component signal due to the pre-pit components, and to further reduce phase fluctuation of the wobble signal (two-value signal).

The predetermined values used by the adder and subtractor may be variable. As a result, it is possible to set these predetermined values arbitrarily. Thereby, it is possible to set the upper-limit value and lower-limit value arbitrarily. Accordingly, it is possible to effectively cope with a case where the optimum values of the upper-limit value and lower-limit value are different depending on the type of the disc, whether data is being recorded or being reproduced, and so forth.

A wobble-signal detecting device, according to another aspect of the present invention, for detecting a wobble signal based on a signal which is the difference between outputs of two divisions of a light receiving device, the two divisions being located on both sides of a line parallel to an information recording track at a target position thereof, the light receiving device receiving light reflected by a recording medium as a result of an optical beam being incident on the recording medium, the recording medium having the information recording track which or the information recording tracks each of which wobbles at a predetermined frequency, and pre-pits formed at predetermined intervals in areas between the information recording tracks, comprises:

a first pre-pit detecting portion which detects the pre-pits formed in an area on one side of the information recording track;

a second pre-pit detecting portion which detects the pre-pits formed in an area on the other side of the information recording track;

a timing-signal generating portion which generates a sample/hold timing signal based on the outputs of the first pre-pit detecting portion and the second pre-pit detecting portion;

a sample/hold portion which samples/holds the signal which is the difference between the outputs of the two divisions of the light receiving device based on the sample/hold timing signal; and a wobble-frequency-component extracting portion which extracts wobble-frequency components from the output signal of the sample/hold portion and outputs a wobble-frequency-component signal, the wobble signal being obtained based on the wobble-frequency-component signal.

In this arrangement, the push-pull signal is held during periods during which the pre-pits occur and is sampled during all the other periods. Thereby, a signal from which the pre-pit components are removed is obtained. As a result, it is possible to reduce the pre-pit components so much that the pre-pit components can be approximately neglected with respect to the wobble component. Accordingly, it is possible to reduce the influence of the pre-pit components on the wobble signal, to reduce amplitude and phase fluctuation of the wobble signal due to the pre-pit components, and to reduce phase fluctuation of the wobble signal (two-value signal).

The timing-signal generating portion may comprise:

a first pre-pit synchronized-signal generating portion which generates a first pre-pit synchronized signal phase-locked to the output of the first pre-pit detecting portion; and a second pre-pit synchronized-signal generating portion which generates a second pre-pit synchronized signal phase-locked to the output of the second pre-pit detecting portion;

and a portion which generates, from the first pre-pit synchronized signal and the second pre-pit synchronized signal, the sample/hold timing signal for holding the signal which is the difference between the outputs of the two divisions of the light receiving device only during periods during which the first and second pre-pits may occur.

In this arrangement, the sample/hold-timing signal is generated to be phase-locked to the occurrences of the pre-pits using a PLL circuit or the like. Accordingly, it is possible to remove the pre-pit components precisely through a simple arrangement. Thus, it is possible to effectively reduce phase fluctuation of the wobble signal (two-value signal) due to the pre-pit components.

Further in this arrangement, it is possible to easily predict the times at which the pre-pits occur. As a result, it is possible to prevent the push-pull signal from being held during the time periods during which it is not necessary to hold the push-pull signal. Thus, it is possible to more effectively reduce and phase fluctuation of the wobble signal (two-value signal) due to the pre-pit components.

An information recording apparatus, according to the present invention, for recording information on a recording medium having an information recording track which or the information recording tracks each of which wobbles at a predetermined frequency, and pre-pits formed at predetermined intervals in areas between the information recording tracks, the apparatus comprising:

a wobble-signal detecting device, which is any one of the above-described wobble-signal detecting devices, for detecting a wobble signal based on a signal which is the difference between outputs of two divisions of light receiving device, the two divisions being located on both sides of a line parallel to an information recording track at a target position thereof, the light receiving device receiving light reflected by the recording medium as a result of an optical beam being incident on the recording medium;

a rotation controlling portion which controls the rotation of the recording medium so that the frequency of the wobble signal becomes a predetermined frequency;

a recording-clock-signal generating portion which generates a recording clock signal from the wobble signal; and a recording portion which records information on the recording medium using the recording clock signal as a reference signal.

In this arrangement, the wobble signal (two-value signal), phase fluctuation of which due to the pre-pit components is reduced, is provided by the wobble-signal detecting device, and is used for rotation control and generation of the recording clock signal. Thereby, the recording clock signal which is synchronized with the rotation of the disc with high accuracy and has few jitters can be obtained, and, as a result, it is possible to record information with high accuracy.

Other objects and further features of the present invention will become more apparent from the following detailed description when read in conjunction with the accompanying drawings.

BRIEF DESCRIPTION OF THE DRAWINGS

FIG. 1A shows a waveform of a push-pull signal for illustrating operations of an information recording apparatus shown in FIG. 3;

FIG. 1B shows a wave form of a wobble-frequency-component signal extracted from the push-pull signal shown in FIG. 1A;

FIG. 2 schematically illustrates an arrangement of wobbles and pre-pits of DVD-R;

DETAILED DESCRIPTION OF THE PREFERRED EMBODIMENT

Figure 3:
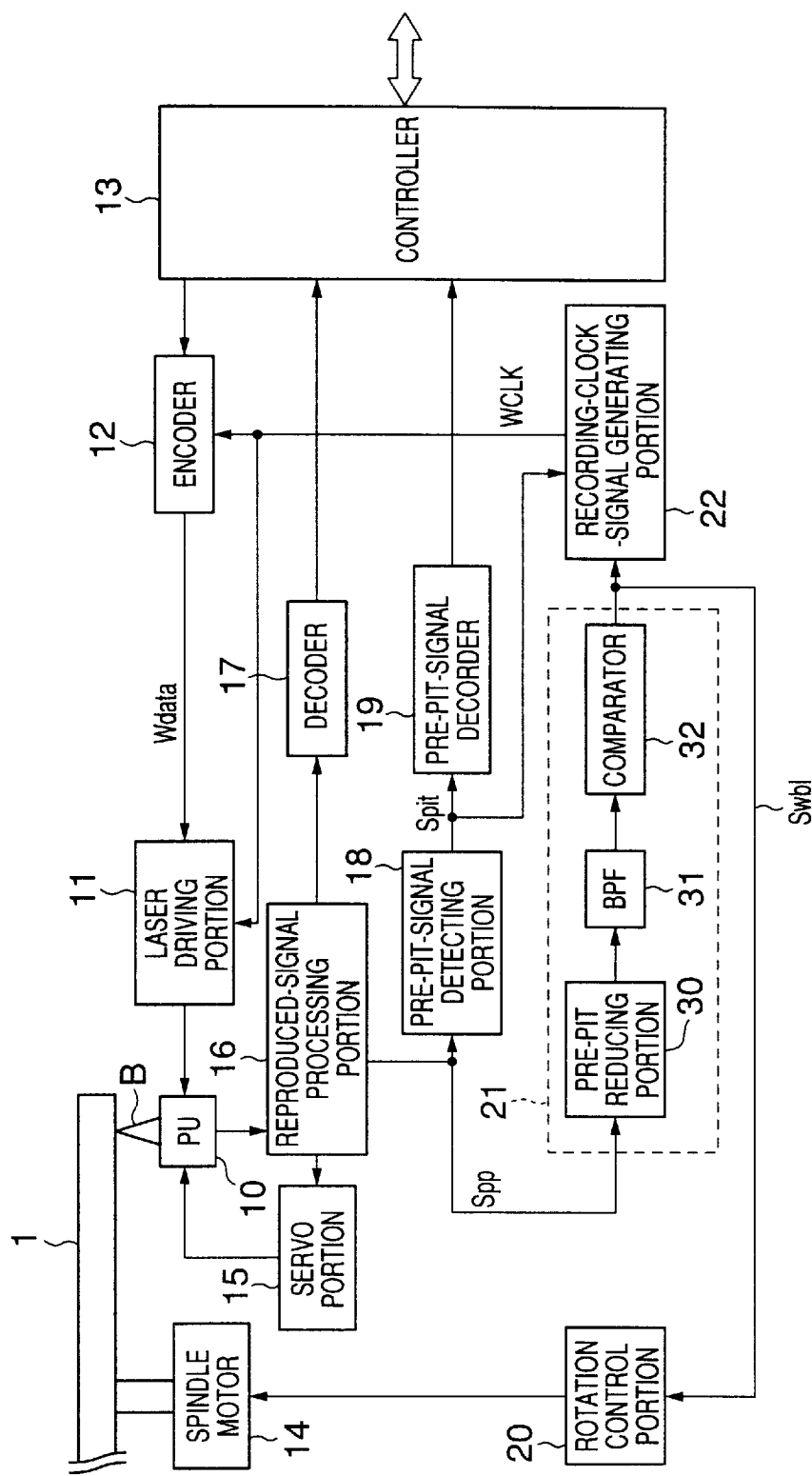
FIG. 3 shows an entire arrangement of the information recording apparatus including a wobble-signal detecting device according to the present invention.

Embodiments of the present invention will now be described based on figures.

First, an embodiment of a recording medium preferable for the present invention will now be described.

In this recording medium, a groove which is a data recording track or each of grooves which are data recording tracks wobbles at a predetermined frequency, and pre-pits are formed on lands which are areas between the grooves at predetermined intervals.

For the sake of describing more specifically, description will now be made for a DVD-R which is a recording medium having the above-mentioned form, for example.

FIG. 2 schematically illustrates an arrangement of the wobbles and pre-pits of the DVD-R.

Data to be recorded on this recording medium is previously divided into sync frame units which are information units. 26 sync frames constitute 1 sector, and 16 sectors constitute 1 ECC (Error Correction Code) block.

At the top of each sync frame, synchronization information SY exists, for establishing synchronization.

On the other hand, on this recording medium, a groove which or grooves, each of which wobbles at a predetermined fixed frequency (wobble frequency; fw), one pre-pit (referred to as a 'synch pre-pit', in particular) which indicates a synchronization signal on a land adjacent to and on one side (the outer side in this embodiment) of the groove, and, also, pre-pits 0, 1, 2 which indicate address information and so forth are previously formed for each sync frame.

As shown in FIG. 2, an even-numbered sync frame (referred to as 'EVEN frame', hereinafter) and an odd-numbered frame (referred to as 'ODD' frame, hereinafter) constitute a pair. Normally, the pre-pits are arranged in a position for the EVEN frame. However, when it is estimated that pre-pits are present in both side lands, the pre-pits are shifted to the position for the ODD frame for the purpose of avoiding mutual interference.

That is, pre-pits are arranged only one of EVEN and ODD frames constituting each pair.

In a land adjacent to and on the other side (inner side) of the groove, pre-pits for another (inner) groove are formed.

The wobble frequency fw is 8 times the frequency of the sync frames, and the pre-pits are arranged so as to be positioned approximately at the peaks of the first three wobbles, respectively, in one sync frame. The first pre-pit of these three pre-pits is the sync pre-pit.

When data is recorded on this recording medium, the data is recorded in synchronization with the pre-pits so that the synchronization information SY is positioned adjacent to the sync pre-pit.

At this time, a recording clock signal is used as a reference signal. A wobble signal which is used as a reference signal for generating the recording clock signal is detected using a wobble-signal detecting device according to the present invention in such a manner that phase fluctuation of the wobble signal is reduced, and, thereby, it is possible to perform high-accuracy synchronous recording.

The entire arrangement and operations of an embodiment of an information recording apparatus according to the present invention will now be described based on figures.

FIG. 3 shows the entire arrangement of the information recording apparatus including a wobble-signal detecting device 21 according to the present invention.

This information recording device includes a pickup (PU) 10, a reproduced signal processing portion 16, a decoder 17, an encoder 12, a laser driving portion 11, a servo portion 15, a spindle motor 14 which rotates a recording medium 1 such as the above-described DVD-R or the like, a rotation control portion 20, a controller 13 which includes an interface with a terminal unit such as an external host computer or the like not shown in the figure, a pre-pit-signal detecting portion 18, a pre-pit-signal decoder 19, a recording-clock-signal generating portion 22 and the wobble-signal detecting device 21.

The pickup 10 including a laser which is a light source, a light receiving device, and so forth, not shown in the figure, converges an optical beam emitted by the laser onto the recording medium 1, and converts the reflected light from the recording medium 1 into a light reception signal.

The laser driving portion 11 drives the laser and controls the light intensity of the laser to a desired value, modulates the optical beam to be emitted from the laser based on recording data Wdata. At this time, the modulation is performed using a recording clock signal WCLK as a reference signal.

The encoder 12 uses the recording clock signal WCLK as a reference signal, and performs ECC processing, 8-16 modulation processing, scramble processing and so forth on data to be recorded input from the controller 13, and generates the recording data Wdata.

The reproduced-signal processing portion 16 processes the light-reception signal from the pickup 10, and generates a reproduced signal, a servo signal and a push-pull signal Spp.

As is well known, the push-pull signal is a differential signal of outputs from two divisions of a light-receiving device, which two divisions are obtained as a result of the light-receiving device being divided by a line parallel to the direction of the tangent of the track at a target position, and receiving the light reflected by the recording medium 1.

FIG. 1A shows one example of the push-pull signal.

As shown in FIG. 1A, the push-pull signal includes a wobble component and pre-pit components.

The pre-pit components of the push-pull signal include upper ones and lower ones corresponding to the pre-pits formed in the lands adjacent to and on the inner and outer sides of the target groove. In FIG. 1A, the upper pre-pit components 4 correspond to the pre-pits formed for the target groove. As shown in the figure, the pre-pit components occur approximately at the peaks of wobbles.

The lower pre-pit components 5 correspond to the pre-pits formed for the other (next inner) groove, and the phase thereof with respect to the wobbles of the target groove varies every moment.

The push-pull signal Spp may be one obtained as a result of gain adjustment (for example, adjustment using the received-light-sum signal) being performed on the differential signal of the outputs of the two divisions of the light receiving device, for the following stage to easily process the signal, or one obtained as a result of processing such as data holding using a sample/hold circuit being performed on the differential signal when the laser is emitting the optical beam in recording power.

Further, the push-pull signal Spp may be one obtained as a result of the DC component being cut off using a HPF (High Pass Filter). Thereby, it is possible to remove the offset from the push-pull signal.

The decoder 17 decodes the reproduced signal, generates a demodulated signal and outputs it to the controller 13.

The servo portion performs control operations based on the servo signal such that the optical beam from the pickup 10 is incident on an arbitrary position of the recording medium 1.

The rotation control portion 20 controls the rotation of the recording medium 1 by outputting a control signal such that the frequency of the wobble signal Swbl becomes the predetermined frequency. The spindle motor 14 rotates the recording medium 1 based on the control signal.

The pre-pit-signal detecting portion 18 generates a pre-pit signal Spit from the push-pull signal Spp, and includes a comparator which compares the push-pull signal with a predetermined threshold Vthpit (see FIG. 1A), and so forth.

The pre-pit decoder 19 decodes the pre-pit signal Spit, thereby, obtains address information and so forth previously pre-formatted on the recording medium 1, and outputs it to the controller 13.

The recording-clock-signal generating portion 22 generates a recording clock signal WCLK based on the wobble signal Swbl, or on the wobble signal Swbl and pre-pit signal Spit. Data to be recorded is processed based on the recording clock signal WCLK.

This recording-clock-signal generating portion 22 is, normally, formed by a so-called PLL (Phase Locked Loop) circuit, and, generally, when the jitters of the input wobble signal Swbl are few, it is possible to reduce the jitters of the recording clock signal WCLK generated by the recording-clock-signal generating portion 22.

The wobble-signal detecting device 21 includes a pre-pit reducing portion 30 which reduces the pre-pit components included in the push-pull signal Spp and outputs the pre-pit-component-reduced push-pull signal Spplmt, a band pass filter (BPF) 31, for example, acting as means for extracting wobble-frequency components from the pre-pit-component-reduced push-pull signal Spplmt, and a comparator 32 acting as means for converting the thus-extracted wobble-frequency-component signal into a two-value signal which is the wobble signal Swbl.

Because the pre-pit components are reduced before the wobble-frequency components are extracted, it is possible to reduce amplitude fluctuation and phase fluctuation of the thus-obtained wobble signal, and to obtain the wobble signal Swbl in which the jitters are reduced.

A detailed arrangement and operations of the wobble-signal detecting device 21 according to the present invention will now be described.

Figure 4:
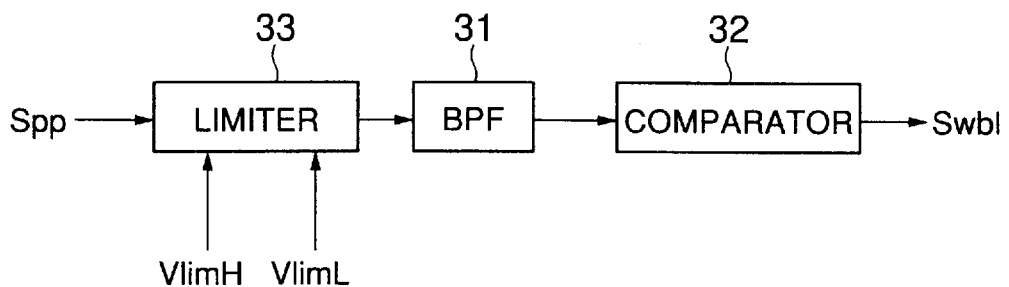
FIG. 4 shows a first embodiment of the wobble-signal detecting device shown in FIG. 3.

FIG. 4 shows an arrangement of one embodiment of the wobble-signal detecting device 21 according to the present invention.

This wobble-signal detecting device 21 includes a limiter 33 which limits the pre-pit components by performing amplitude limiting on the push-pull signal Spp in accordance with predetermined upper-limit value VlimH and lower-limit value VlimL and outputs the amplitude-limited push-pull signal, a BPF 31 which extracts the wobble-frequency (fw) components from the amplitude-limited push-pull signal, and a comparator 32 which converts the thus-obtained wobble-frequency-component signal into a two-value signal which is the wobble signal Swbl.

Figure 5A:
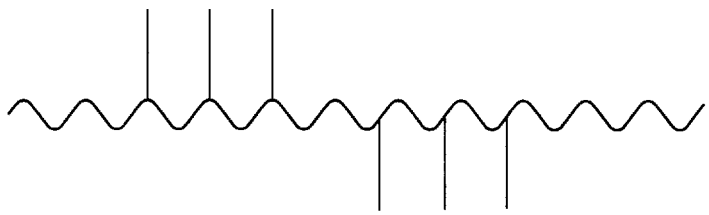
FIG. 5A shows a waveform of an example of the push-pull signal for illustrating operations of the first and second embodiments of the wobble-signal detecting device shown in FIGS. 4, and 6A or 6B.
Figure 5B:
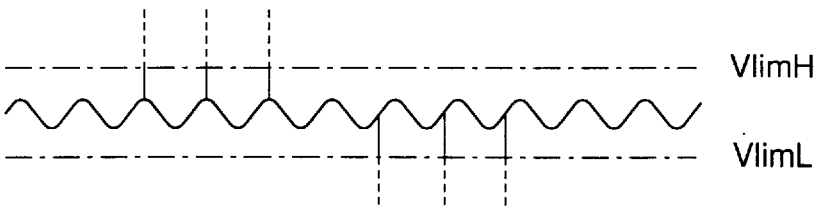
FIG. 5B shows a waveform of a signal output from a limiter shown in FIG. 4.

FIG. 5B shows one example of a waveform of the amplitude-limited push-pull signal in which the portions exceeding the predetermined upper-limit value VlimH and lower-limit value VlimL are cut off.

Thus, by limiting the amplitude of the push-pull signal Spp, it is possible to reduce the pre-pit components, and, to reduce amplitude and phase fluctuation of the wobble signal occurring due to the pre-pit components.

It is also possible to cut off the portions of the push-pull signal only on a side, the portions on the side mainly causing amplitude and phase fluctuation of the wobble signal. That is, it is possible to perform amplitude limiting only in accordance with either one of the predetermined upper-limit value VlimH and lower-limit value VlimL.

Figure 6A:
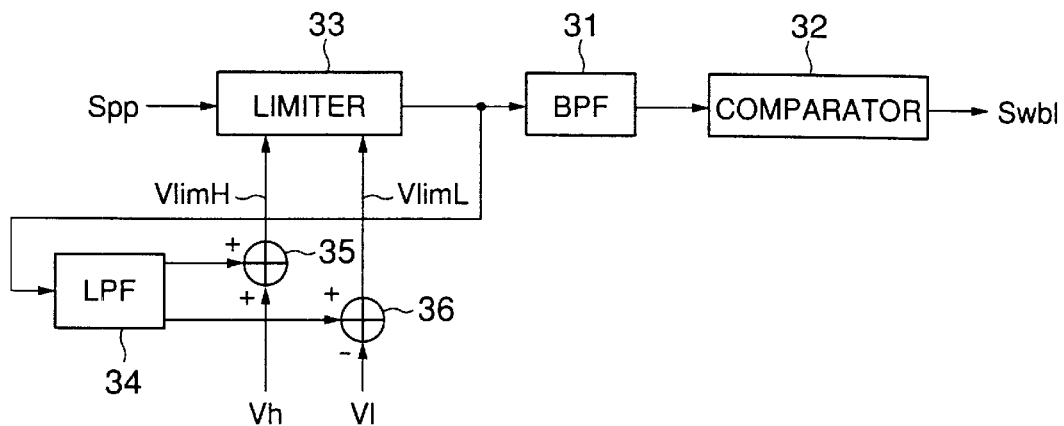
FIG. 6A shows a second embodiment of the wobble-signal detecting device shown in FIG. 3.

FIG. 6A shows an arrangement of a second embodiment of the wobble-signal detecting device 21.

This wobble-signal detecting device 21 includes, in addition to the arrangement shown in FIG. 4, an LPF (Low Pass Filter) 34 which receives the amplitude-limited push-pull signal and has such a cut-off frequency fc (for example, in the range of 4 to 5 times fw) as to allow the wobble-frequency (fw) components to pass therethrough, an adding portion 35 which adds a predetermined voltage Vh to the output of the LPF 34, and a subtracting portion 36 which subtracts a predetermined voltage Vl from the output of the LPF 34.

The output of the adding portion 35 and the output of the subtracting portion 36 are used as the upper-limit value VlimH and lower-limit value VlimL, respectively, of the limiter 33.

Figure 5C:
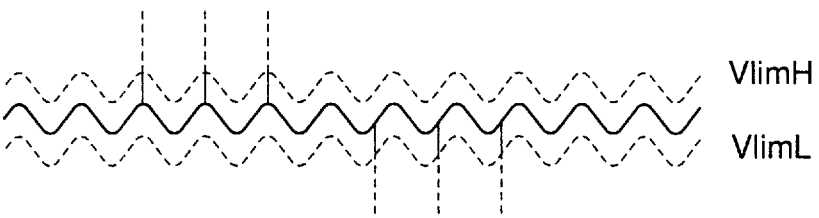
FIG. 5C shows a waveform of a signal output from a limiter shown in FIG. 6A or 6B.

FIG. 5C shows one example of a waveform of the amplitude-limited push-pull signal, obtained in the case where the above-mentioned upper-limit value VlimH and lower-limit value VlimL are used by the limiter 33. In this case, because it is possible to limit the amplitude of only the pre-pit components even when the wobble amplitude changes, it is possible to further reduce the pre-pit components, and, to further reduce amplitude and phase fluctuation of the wobble signal.

Specially, because it is possible to limit the amplitude of the pre-pit components on the lower side similarly regardless of the phase relationship with the wobbles, this method is more advantageous for reducing amplitude and phase fluctuation occurring due to the pre-pit components.

Furthermore, because, when the push-pull signal Spp fluctuates at a low frequency (a frequency sufficiently lower than the wobble frequency), the upper-limit value VlimH and lower-limit value VlimL change correspondingly, it is possible to limit the pre-pit components precisely and sufficiently.

It is preferable that the LPF 34 is such that the phase delay around the wobble frequency fw is small.

Figure 6B:
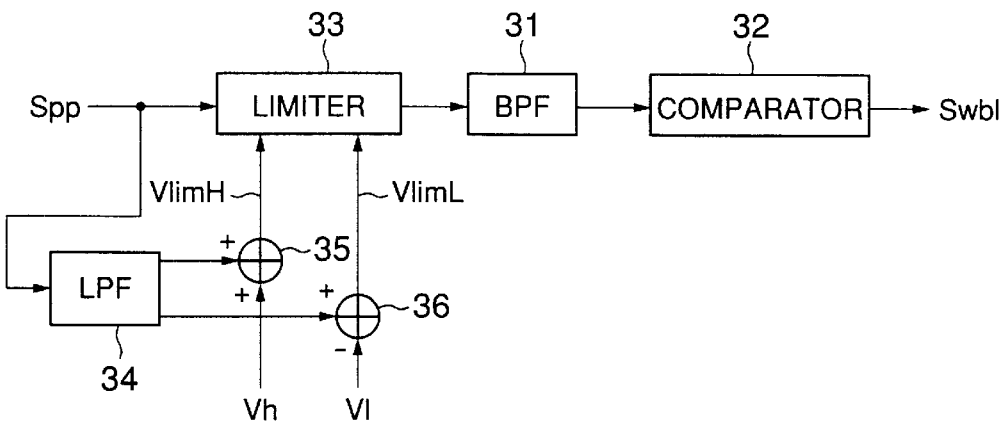
FIG. 6B shows a variant embodiment of the second embodiment of the wobble-signal detecting device shown in FIG. 6A.

Further, it is possible to use a BPF instead of the LPF 34, and it is possible that the input to the LPF 34 be the push-pull signal Spp, as shown in FIG. 6B.

Further, in the embodiment shown in FIG. 4, by enabling the upper-limit value VlimH and lower-limit value VlimL to be set variously by the controller 13 or the like, it is possible to effectively cope with a case where the optimum values of the upper-limit value VlimH and lower-limit value VlimL are different depending on the type of the disc, whether data is being recorded or being reproduced, and so forth.

Similarly, in the embodiment shown in FIG. 6A or 6B, by enabling the values Vh and Vl to be set variously by the controller 13 or the like, it is possible to effectively cope with a case where the optimum values of the values Vh and Vl are different depending on the type of the disc, whether data is being recorded or being reproduced, and so forth.

Figure 7:
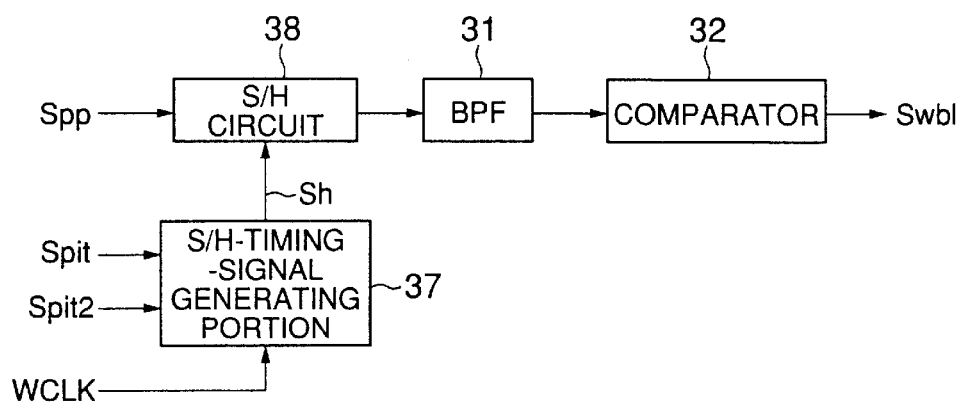
FIG. 7 shows a third embodiment of the wobble-signal detecting device shown in FIG. 3.

FIG. 7 shows an arrangement of the wobble-signal detecting device 21 in a third embodiment of the present invention.

This wobble-signal detecting device 21 includes a sample/hold circuit (S/H circuit) 38 which performs sampling and holding on the push-pull signal Spp in accordance with a holding signal Sh, a BPF 31 which extracts the wobble-frequency (fw) components from the output of the S/H circuit 38, a comparator 32 which converts the thus-obtained wobble-frequency-component signal into a two-value signal which is the wobble signal Swbl, and an S/H-timing-signal generating portion 37 which generates the holding signal Sh from the pre-pit signal Spit (referred to as a 'first pre-pit signal', hereinafter) and a second pre-pit signal Spit2 output from a second-pre-pit-signal detecting portion described below.

The second-pre-pit-signal detecting portion, not shown in the figure, detects the pre-pits (referred to as 'second pre-pits') formed in the land adjacent to and on the side of the target groove, which side is different from the side with the land which has the pre-pits (for the sake of convenience, referred to as 'first pre-pits'), detected by the pre-pit-signal detecting portion 18, formed therein.

Further, the S/H-timing-signal generating portion 37 may use the recording clock signal WCLK as a reference signal.

Figure 8A:
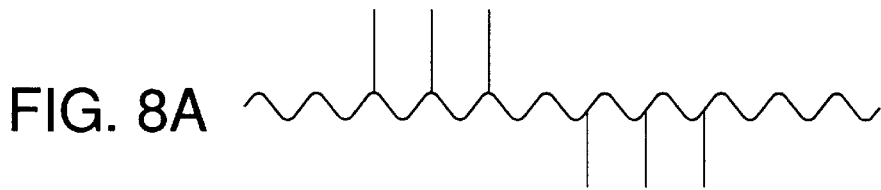
FIGS. 8A, 8B and 8C show waveforms of an example of signals for illustrating operations of the third embodiment of the wobble-signal detecting device shown in FIG. 7.
Figure 8B:
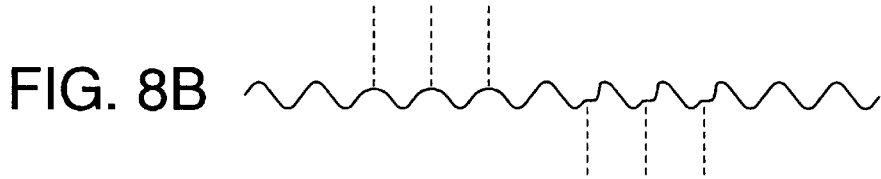
Figure 8C:
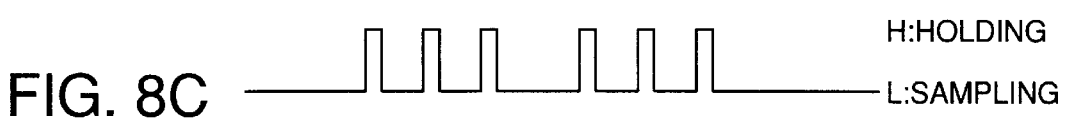

FIGS. 8A, 8B and 8C show waveforms of example of signals for illustrating operations of this wobble-signal detecting device 21. FIG. 8A shows the push-pull signal Spp, FIG. 8B shows the output of the S/H circuit 38 and FIG. 8C shows the holding signal Sh. The S/H circuit 38 samples the value of the push-pull signal Spp and outputs the thus-sampled value every moment during the time during which the level of the holding signal Sh is low and holds the value once-sampled immediately before the level of the holding signal Sh changes from the low level to the high level and outputs the thus-held same value during the time during which the level of the holding signal Sh is high.

As shown in the figures, the S/H circuit 38 holds the value once sampled immediately before the level of the holding signal Sh changes from the low level to the high level and outputs the thus-held same value continuously during each of the time periods during which the pre-pits on both the sides occur. The holding signal Sh, the level of which is high during these periods, can be generated from the first and second pre-pit signals Spit and Spit2. Thereby, the pre-pit components are not sampled and, thus, are not output from the S/H circuit 38, as shown in FIG. 8B.

Thus, by removing the pre-pit components from the push-pull signal before the wobble-frequency components are extracted from the push-pull signal, it is possible to reduce amplitude fluctuation and phase fluctuation of the wobble signal due to the pre-pit components, and to obtain the wobble signal Swbl in which the jitters are reduced.

The S/H-timing-signal generating portion 37, for example, generates a signal, as the holding signal Sh, which is the logical sum of the signal obtained as a result of the width of each pulse of the first pre-pit signal Spit (high (H) during the time period during which the respective first pre-pit occurs) being extended to a predetermined amount and the signal obtained as a result of the width of each pulse of the second pre-pit signal Spit2 (high (H) during the time period during which the respective second pre-pit occurs) being extended to a predetermined amount.

Alternatively, the S/H-timing-signal generating portion 37 may generate the signal, as the holding signal Sh, obtained as a result of the width of each pulse of the signal which is the logical sum of the first pre-pit signal Spit and the second pre-pit signal being extended.

Figure 9:
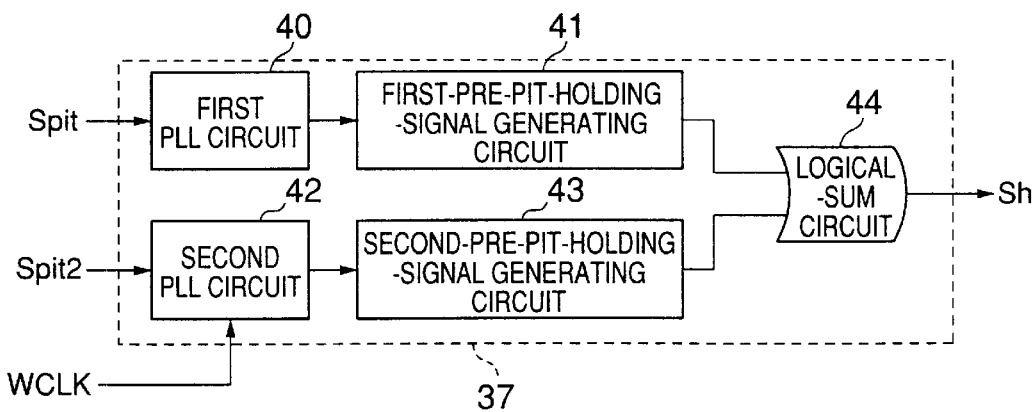
FIG. 9 shows an example of an S/H-timing-signal generating portion shown in FIG. 7.

Further, the S/H-timing-signal generating portion 37 includes, as shown in FIG. 9, a first PLL circuit 40 which generates a signal synchronized with the occurrences of the first pre-pits, a circuit 41 which generates a first pre-pit holding signal based on the output signal of the first PLL circuit 40, a second PLL circuit 42 which generates a signal synchronized with the occurrences of the second pre-pits, a circuit 43 which generates a second pre-pit holding signal based on the output signal of the second PLL circuit 42, and a circuit 44 which obtains the logical sum of the first and second pre-pit holding signals. Each of the above-mentioned respective PLL circuits 40 and 42 can be obtained very easily by using the recording clock signal WCLK.

That is, assuming that the period of the occurrences of the wobbles is nT (T is the period of (the pulses of) the recording clock signal WCLK), the minimum interval between the occurrences of the pre-pits is also nT (for the pickup 10 when the rotation of the recording medium 1 is ideally controlled). Therefore, an n-counter is provided, which counts pulses of the recording clock signal WCLK, and, when the thus-obtained count value becomes n, outputs a pulse and resets the count value to 0. Then, a predetermined value m is loaded in the n-counter as the count value thereof when the count value of the n-counter at the time of rising edge (or decaying edge) of the pre-pit signal is not equal to the predetermined value m, every rising (or decaying edge) of the pre-pit signal. The difference obtained from subtracting the count value at the time of rising edge (or decaying edge) of the pre-pit signal from the predetermined value m corresponds to the PLL phase difference. For example, the predetermined value m is set to 0. In this case, the count value of the n-counter is forcibly reset to 0 every rising edge (or decaying edge) of the pre-pit signal.

It is also possible that the PLL phase differences are averaged for a plurality of pulses of the pre-pit signal, and the count value of the n-counter is adjusted so that the thus-obtained average PLL phase difference is subtracted from the count value. Thereby, influence of noises can be reduced.

Thus, the count value of the n-counter is synchronized with the pre-pit signal, and the phase of the count value of the n-counter is caused to coincide with the phase of the pre-pit signal. Therefore, the pre-pit components of the push-pull signal are removed, as shown in FIG. 8B, as a result of the once-sampled value of the push-pull signal being held and the thus-held same value being continuously output during the time period (or the time period obtained as a result of appropriately lengthening, shortening and/or shifting the time period) during which the count value of the n-counter is the predetermined value m.

When it is previously known that the pre-pits are arranged only at the first three wobbles of the eight wobbles (corresponding to one sync frame) as in the case of DVD-R as shown in FIG. 2, the above-mentioned operation of holding the once-sampled value and continuously outputting the thus-held same value is not performed for the remaining five wobbles. As a result, it is possible to precisely removing the pre-pit components by this holding operation, the holding operation can be prevented from being performed during the time interval in which it is not necessary to perform the holding operation, and to obtain the wobble signal, the phase fluctuation of which is further reduced. For other types of recording media, effective removal of pre-pit components from the wobble signal can be similarly achieved, by creating methods respectively suitable for the rules for the pre-formatting manners therefor.

Further, the recording medium described in the above description of the embodiments is DVD-R which is the write-once type of optical disc. However, the present invention can also be applied to an information recording apparatus using an erasable-type(write-many) optical disc using phase change material as a recording layer (phase change optical disc), and to information recording apparatuses using recording media made of other materials as recording layers.

Further, the present invention is similarly advantageous also for a recording medium, whose pre-formatting manner is such that pre-pits are formed in a track (groove or land) and track(s) (land(s) or groove(s)) adjacent to and on one side or both sides thereof.

Further, the present invention is not limited to the above-described embodiments and variations and modifications may be made without departing from the scope of the present invention.

The present application is based on Japanese priority application No. 11-092821, filed on Mar. 31, 1999, the entire contents of which are hereby incorporated by reference.

What is claimed is:

1. A wobble-signal detecting device for detecting a wobble signal based on a signal which is the difference between outputs of two divisions of a light receiving device, said two divisions being located on both sides of a line parallel to an information recording track at a target position thereof, said light receiving device receiving light reflected by a recording medium as a result of an optical beam being incident on said recording medium, said recording medium having the information recording track which or the information recording tracks each of which wobbles at a predetermined frequency, and pre-pits formed at predetermined intervals in areas between the information recording tracks, said device comprising:

a pre-pit controlling portion which removes or reduces the pre-pit components of the signal which is the difference between the outputs of said two divisions of said light receiving device, and outputs a pre-pit-component-controlled signal; and a wobble-frequency-component extracting portion which extracts wobble-frequency components from the pre-pit-component-controlled signal and outputs a wobble-frequency-component signal, the wobble signal being obtained based on the wobble-frequency-component signal.

2. A wobble-signal detecting device for detecting a wobble signal based on a signal which is the difference between outputs of two divisions of a light receiving device, said two divisions being located on both sides of a line parallel to an information recording track at a target position thereof, said light receiving device receiving light reflected by a recording medium as a result of an optical beam being incident on said recording medium, said recording medium having the information recording track which or the information recording tracks each of which wobbles at a predetermined frequency, and pre-pits formed at predetermined intervals in areas between the information recording tracks, said device comprising:

a limiter which limits the amplitude of the signal which is the difference between the outputs of said two divisions of said light receiving device and outputs an amplitude-limited signal so that the amplitude of the amplitude-limited signal does not exceed both or at least either one of a predetermined upper-limit value and a predetermined lower-limit value;

a wobble-frequency-component extracting portion which extracts wobble-frequency components from the amplitude-limited signal and outputs a wobblefrequency-component signal, the wobble signal being obtained based on the wobble-frequency-component signal;

a filter which cuts off high-frequency components of the output signal of said limiter or the signal which is the difference between the outputs of said two divisions of said light receiving device;

an adder which adds a predetermined value to the output of said filter; and a subtractor which subtracts a predetermined value from the output of said filter, wherein said limiter uses the output of said adder as the upper-limit value and uses the output of said subtractor as the lower-limit value.

3. The wobble-signal detecting device as claimed in claim 2, wherein the predetermined values used by said adder and subtractor are variable.

4. A wobble-signal detecting device for detecting a wobble signal based on a signal which is the difference between outputs of two divisions of light receiving device, said two divisions being located on both sides of a line parallel to an information recording track at a target position thereof, said light receiving device receiving light reflected by a recording medium as a result of an optical beam being incident on said recording medium, said recording medium having the information recording track which or the information recording tracks each of which wobbles at a predetermined frequency, and pre-pits formed at predetermined intervals in areas between the information recording tracks, said device comprising:

a first pre-pit detecting portion which detects the pre-pits formed in an area on one side of the information recording track;

a second pre-pit detecting portion which detects the pre-pits formed in an area on the other side of the information recording track;

a timing-signal generating portion which generates a sample/hold timing signal based on the outputs of said first pre-pit detecting portion and said second pre-pit detecting portion;

a sample/hold portion which samples/holds the signal which is the difference between the outputs of said two divisions of said light receiving device based on the sample/hold timing signal; and a wobble-frequency-component extracting portion which extracts wobble-frequency components from the output signal of said sample/hold portion and outputs a wobble-frequency-component signal, the wobble signal being obtained based on the wobble-frequency-component signal.

5. The wobble-signal detecting device as claimed in claim 4, wherein said timing-signal generating portion comprises:

a first pre-pit synchronized-signal generating portion which generates a first pre-pit synchronized signal phase-locked to the output of said first pre-pit detecting portion; and a second pre-pit synchronized-signal generating portion which generates a second pre-pit synchronized signal phase-locked to the output of said second pre-pit detecting portion;

and a portion which generates, from the first pre-pit synchronized signal and the second pre-pit synchronized signal, the sample/hold timing signal for holding the signal which is the difference between the outputs of said two divisions of said light receiving device only during periods during which the first and second pre-pits may occur.

6. An information recording apparatus for recording information on a recording medium having an information recording track which or the information recording tracks each of which wobbles at a predetermined frequency, and pre-pits formed at predetermined intervals in areas between the information recording tracks, said apparatus comprising:

a wobble-signal detecting device for detecting a wobble signal based on a signal which is the difference between outputs of two divisions of a light receiving device, said two divisions being located on both sides of a line parallel to an information recording track at a target position thereof, said light receiving device receiving light reflected by the recording medium as a result of an optical beam being incident on said recording medium;

a rotation controlling portion which controls the rotation of the recording medium so that the frequency of the wobble signal becomes a predetermined frequency;

a recording-clock-signal generating portion which generates a recording clock signal from the wobble signal; and a recording portion which records information on the recording medium using the recording clock signal as a reference signal, wherein said wobble-signal detecting device comprises:

a pre-pit controlling portion which removes or reduces the pre-pit components of the signal which is the difference between the outputs of said two divisions of said light receiving device, and outputs a pre-pit-component-controlled signal; and a wobble-frequency-component extracting portion which extracts wobble-frequency components from the pre-pit-component-controlled signal and outputs a wobble-frequency-component signal, the wobble signal being obtained based on the wobble-frequency-component signal.

7. An information recording apparatus for recording information on a recording medium having an information recording track which or the information recording tracks each of which wobbles at a predetermined frequency, and pre-pits formed at predetermined intervals in areas between the information recording tracks, said apparatus comprising:

a wobble-signal detecting device for detecting a wobble signal based on a signal which is the difference between outputs of two divisions of a light receiving device, said two divisions being located on both sides of a line parallel to an information recording track at a target position thereof, said light receiving device receiving light reflected by the recording medium as a result of an optical beam being incident on said recording medium;

a rotation controlling portion which controls the rotation of the recording medium so that the frequency of the wobble signal becomes a predetermined frequency;

a recording-clock-signal generating portion which generates a recording clock signal from the wobble signal; and a recording portion which records information on the recording medium using the recording clock signal as a reference signal, wherein said wobble-signal detecting device comprises:

a first pre-pit detecting portion which detects the pre-pits formed in an area on one side of the information recording track;

a second pre-pit detecting portion which detects the pre-pits formed in an area on the other side of the information recording track;

a timing-signal generating portion which generates a sample/hold timing signal based on the outputs of said first pre-pit detecting portion and said second pre-pit detecting portion;

a sample/hold portion which samples/holds the signal which is the difference between the outputs of said two divisions of said light receiving device based on the sample/hold timing signal; and a wobble-frequency-component extracting portion which extracts wobble-frequency components from the output signal of said sample/hold portion and outputs a wobble-frequency-component signal, the wobble signal being obtained based on the wobble-frequency-component signal.

* * * * *